(12) United States Patent
Cheng et al.

(10) Patent No.: US 11,716,220 B2
(45) Date of Patent: Aug. 1, 2023

(54) ETHERNET TRANSCEIVER DEVICE AND ETHERNET PHYSICAL-LAYER CIRCUIT

(71) Applicant: Realtek Semiconductor Corp., HsinChu (TW)

(72) Inventors: Ming-Chieh Cheng, HsinChu (TW); Liang-Wei Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 14 days.

(21) Appl. No.: 17/320,184

(22) Filed: May 13, 2021

(65) Prior Publication Data

US 2022/0231879 A1 Jul. 21, 2022

(30) Foreign Application Priority Data

Jan. 18, 2021 (TW) .................................. 110101800

(51) Int. Cl.
*H04L 12/40* (2006.01)
*H04B 3/32* (2006.01)
*H04L 69/14* (2022.01)

(52) U.S. Cl.
CPC ......... *H04L 12/40136* (2013.01); *H04B 3/32* (2013.01); *H04L 69/14* (2013.01)

(58) Field of Classification Search
CPC ...... H04L 12/40136; H04L 69/14; H04B 3/32

USPC ......................................................... 370/252
See application file for complete search history.

(56) References Cited

U.S. PATENT DOCUMENTS

| | | | |
|---|---|---|---|
| 8,659,986 B1 * | 2/2014 | Martinson ............. | H04J 3/0697 370/290 |
| 10,873,365 B1 * | 12/2020 | Sedarat .................... | H04B 3/32 |
| 2008/0232527 A1 * | 9/2008 | Barkan ................. | H04J 3/0685 375/362 |
| 2009/0097393 A1 * | 4/2009 | Diab ..................... | H04L 12/413 370/465 |
| 2011/0255427 A1 * | 10/2011 | Diab ....................... | H04L 43/50 370/252 |
| 2015/0117635 A1 * | 4/2015 | Ho .......................... | H04B 3/32 379/406.08 |

FOREIGN PATENT DOCUMENTS

EP 2 378 742 A1 10/2011

\* cited by examiner

*Primary Examiner* — Kwang B Yao
*Assistant Examiner* — Xuan Lu
(74) *Attorney, Agent, or Firm* — Winston Hsu

(57) ABSTRACT

An Ethernet physical-layer circuit corresponding to a first port is connected to a first link partner device through the first port and a first Ethernet cable. The Ethernet physical-layer circuit and other physical-layer circuits all employ an output oscillation signal of a crystal oscillator to respectively generate clock waveforms, and they are configured in a master mode when the crosstalk noise is converged and compensated.

10 Claims, 7 Drawing Sheets

ETHERNET TRANSCEIVER DEVICE AND ETHERNET PHYSICAL-LAYER CIRCUIT

BACKGROUND OF THE INVENTION

1. Field of the Invention

The present invention is related to Ethernet technology, and more particularly, to an Ethernet transceiver device and an Ethernet physical-layer circuit.

2. Description of the Prior Art

Ethernet is already the commonly used local area network technology. The transmission speed of the Ethernet has evolved from the early 10 MHz and 100 MHz to the mature 1 GHz on the market today and the emerging 2.5 GHz, and faster transmission speed will appear in the future. For increasing the network speed, maximizing the efficiency of use, and improving convenience of use, etc., an actual application does not use only a single physical-layer circuit to connect to Ethernet communication equipment in the same space. The common usage method is to combine multiple physical-layer circuits close to each other at one end, but this combined architecture gives rise to additional problems. Since all physical-layer circuits transmit data simultaneously, when the distance between each other is too close, the signal from another physical-layer circuit becomes noise and interferes with one physical-layer circuit itself, which results in degraded performance of adjacent physical-layer circuits. This interference is called a near end external crosstalk interference, and it is difficult to cancel or compensate for the near end external crosstalk interference between cross-ports.

SUMMARY OF THE INVENTION

It is therefore an objective of the present invention to provide an Ethernet transceiver device and an Ethernet physical-layer circuit, to solve the above-mentioned problems.

According to an embodiment of the present invention, an Ethernet transceiver device is provided. The Ethernet transceiver device comprises a crystal oscillator and a multi-port physical-layer circuit. The crystal oscillator is arranged to generate an output oscillation signal. The multi-port physical-layer circuit is coupled to the crystal oscillator and comprises at least a first port, at least one second port, a first physical-layer circuit, and at least one second physical-layer circuit. The first physical-layer circuit corresponds to the first port and is connected to a first link partner device through the first port and a first Ethernet cable. The at least one second physical-layer circuit corresponds to the at least one second port and is connected to a second link partner device through the at least one second port and at least one second Ethernet cable. The first physical-layer circuit and the at least one second physical-layer circuit all employ the output oscillation signal of the crystal oscillator to generate multiple clock waveforms, respectively, and when a crosstalk noise is converged and compensated, the first physical-layer circuit and the at least one second physical-layer circuit are configured in a master mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
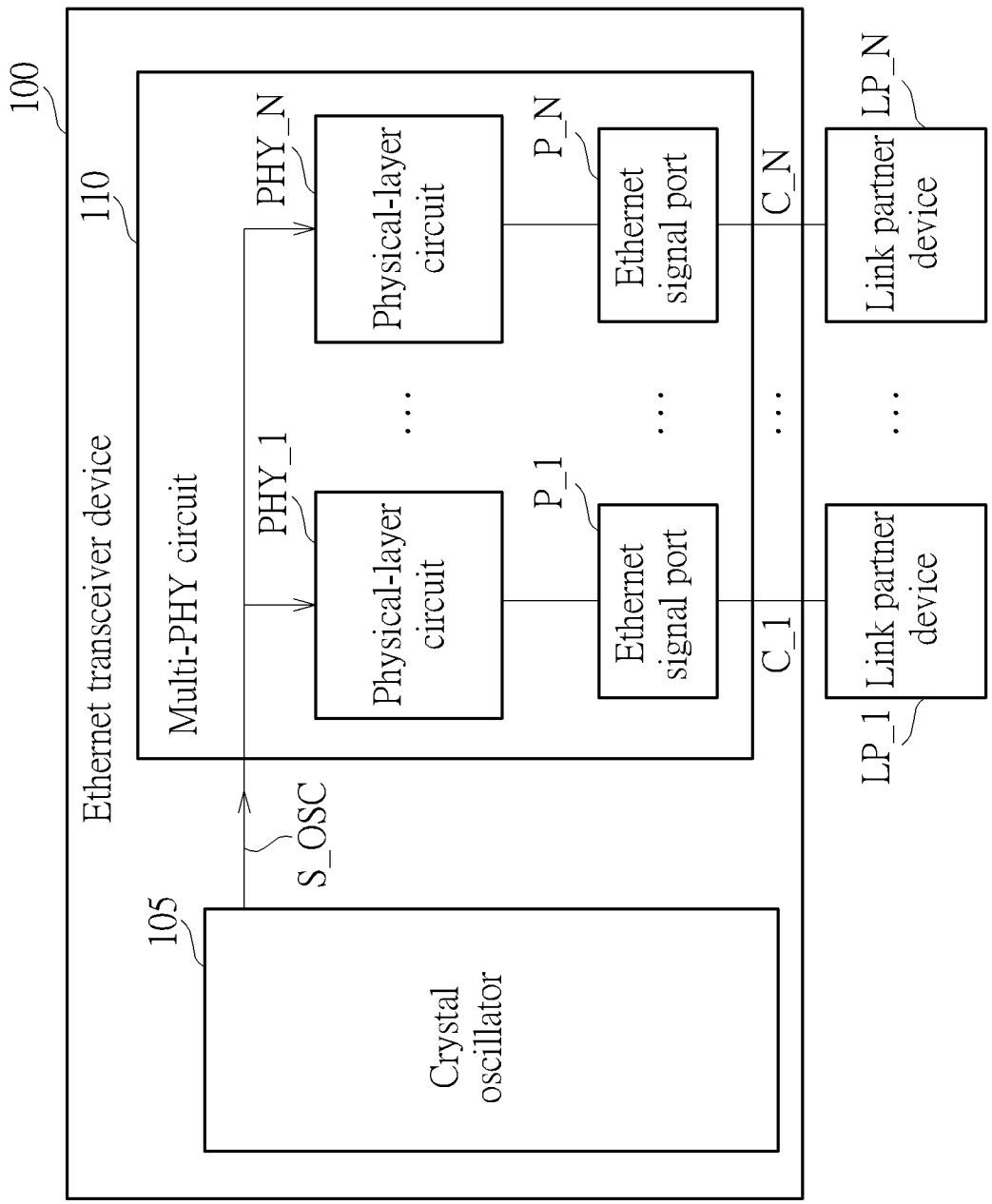
FIG. 1 is a diagram illustrating a multi-port physical-layer architecture device according to an embodiment of the present invention.

Please refer to FIG. 1. FIG. 1 is a diagram illustrating a multi-port physical-layer (PHY) architecture device 100 according to an embodiment of the present invention. As shown in FIG. 1, the multi-PHY architecture device 100, for example, is an Ethernet transceiver device, and comprises a crystal oscillator 105 and a multi-PHY circuit 110. The crystal oscillator 105 is arranged to generate an output oscillation signal S_OSC. The multi-PHY circuit 110 is coupled to the crystal oscillator 105, and comprises at least N Ethernet signal ports P_1-P_N and N physical-layer circuits (Ethernet physical-layer circuits) PHY_1-PHY_N, wherein the number of N is not limited, and the physical-layer circuits PHY_1-PHY_N are all regarded as single port physical-layer circuits. The physical-layer circuit PHY_1 may be regarded as a first physical-layer circuit, and other physical-layer circuits PHY_2-PHY_N may be regarded as at least one second physical-layer circuit. The Ethernet signal port P_1 may be regarded as a first port, and the Ethernet signal ports P_2-P_N may be regarded as at least one second port. It should be noted that in this embodiment, N physical-layer circuits PHY_1-PHY_N are the same type of physical layer circuits, and the Ethernet signal ports P_1-P_N are also the same type of Ethernet signal ports; however, the present invention is not limited thereto.

In addition, the physical-layer circuit PHY_1 corresponds to the first port P_1, and is connected to a link partner device LP_1 through the first port P_1 and a first Ethernet cable C_1. Similarly, the physical-layer circuits PHY_2-PHY_N correspond to the Ethernet signal ports P_2-P_N, respectively, and are connected to different link partner devices LP_2-LP_N through the Ethernet signal ports P_2-P_N and the Ethernet cables C_2-C_N, respectively. In addition, the output oscillation signal S_OSC generated by the crystal oscillator 105 is transmitted to all physical-layer circuits PHY_1-PHY_N, that is, the output oscillation signal S_OSC is shared by the physical-layer circuits PHY_1-PHY_N. The physical-layer circuits PHY_1-PHY_N all use the output oscillation signal S_OSC of the crystal oscillator 105 to generate their respective clock waveforms. On the application side, for example, the physical layer circuits PHY_1-PHY_N jointly use the clock of the output oscillation signal S_OSC oscillated from the crystal oscillator 105 to operate under the same frequency. The link partner devices LP_1-LP_N, for example, may be multiple different small-sized panels integrated into a large panel (e.g. small-sized light-emitting diode panels, but not limited). The physical-layer circuits PHY_1-PHY_N are connected to N small-sized panels for signal connection through the Ethernet cables C_1-C_N, respectively, to achieve the effect of simultaneously controlling the N small-sized panels; however, the present invention is not limited thereto.

In addition, all physical-layer circuits PHY_1-PHY_N in a crosstalk noise cancellation procedure of the multi-PHY architecture device 100 are configured in a master mode. Each of the above-mentioned physical-layer circuits PHY_1-PHY_N has a master mode and a slave mode. When the system is just turned on, the multi-PHY architecture device 100 enters the crosstalk noise cancellation procedure and controls each physical-layer circuit to estimate energy of crosstalk noise and calculate and update one or more compensation coefficients that are arranged to compensate for or cancel the energy of the crosstalk noise. At this time, all physical-layer circuits corresponding to all Ethernet signal ports are configured in the master mode instead of the slave mode. In other words, the link partner devices corresponding to the physical-layer circuits are configured in the slave mode.

Figure 2:
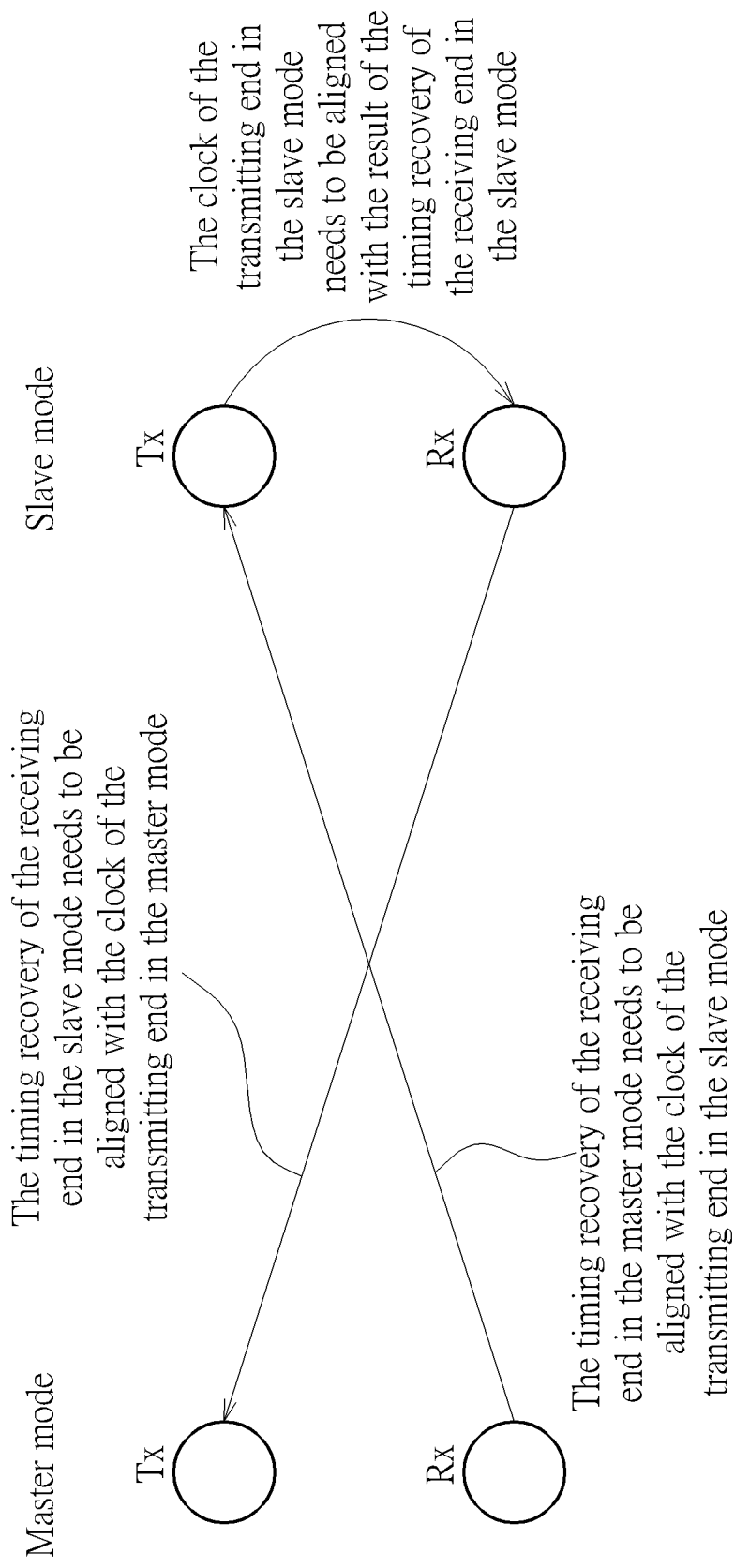
FIG. 2 is a diagram illustrating a relative relationship of device clocks of a master mode and a slave mode according to an embodiment of the present invention.

Please refer to FIG. 2. FIG. 2 is a diagram illustrating a relative relationship of device clocks of a master mode and a slave mode according to an embodiment of the present invention. As shown in FIG. 2, one or each of the physical-layer circuits is configured in the master mode in the embodiment of the present invention. The physical-layer circuit in the master mode may regard a clock signal of a transmitting end of the physical-layer circuit in the master mode as a solution or a better solution of a convergence flow of an entire system crosstalk cancellation. At this time, timing recovery operations of a circuit of a receiving end of a link partner device in the slave mode, for example, are aligned with the clock of the transmitting end of the physical-layer circuit in the master mode. Then, the clock of the circuit of the transmitting end of the link partner device in the slave mode is aligned with the result of the timing recovery operations of the receiving end in the slave mode. The timing recovery operations of the receiving end of the physical-layer circuit in the master mode are aligned with the clock of the transmitting end in the slave mode. In this way, since the physical-layer circuits all share and use the output oscillation signal S_OSC to generate their respective clock waveforms, and are all configured in the master mode for performing the crosstalk noise cancellation, it may be ensured that these different physical-layer circuits all use the timing of the same clock signal, which may reduce the problem of external crosstalk.

Figure 3:
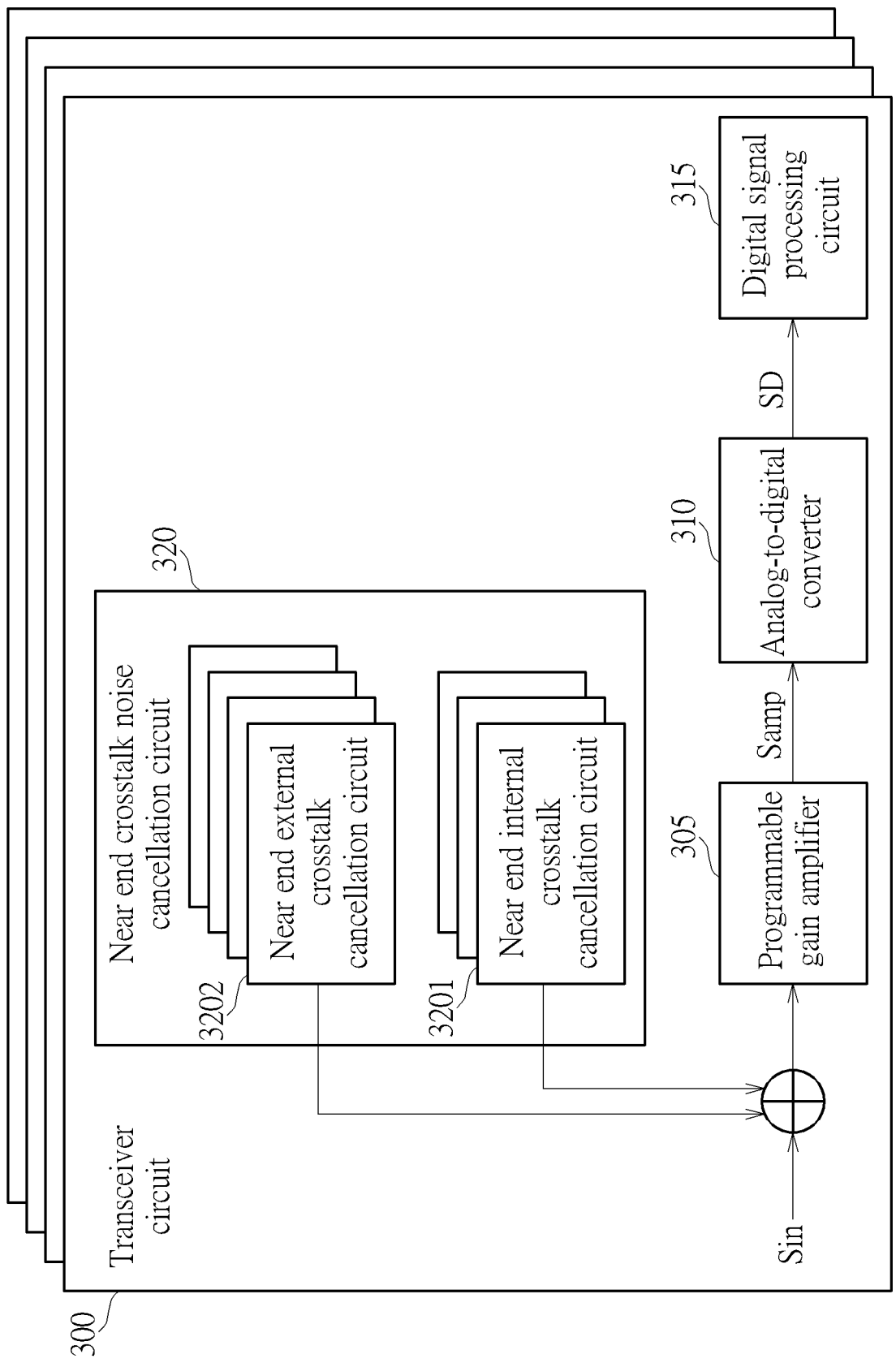
FIG. 3 is a block diagram illustrating one of multiple transceiver circuits of one or each of physical-layer circuits according to the embodiment of the present invention shown in FIG. 1.

Please refer to FIG. 3. FIG. 3 is a block diagram illustrating one of multiple transceiver circuits of one or each of physical-layer circuits according the embodiment of the present invention shown in FIG. 1. In practice, as shown in FIG. 3, a physical-layer circuit (e.g. the first physical-layer circuit PHY_1 or other physical-layer circuits) comprises multiple transceiver circuits corresponding to multiple channels (e.g. 4 channels of Ethernet), respectively. As a result, each physical-layer circuit, for example, comprises 4 transceiver circuits 300, wherein each transceiver circuit 300 corresponds to a specific channel, and comprises at least a programmable gain amplifier 305, an analog-to-digital converter 310, a digital signal processing circuit 315, and a near end crosstalk noise cancellation circuit 320.

The programmable gain amplifier 305 is arranged to receive an input analog receiving signal Sin of the specific channel, and amplify the input analog receiving signal Sin to generate an amplified analog signal Samp. The analog-to-digital converter 310 is coupled to the programmable gain amplifier 305, and is arranged to perform an analog-to-digital conversion on the amplified analog signal Samp to generate a digital receiving signal SD. The digital signal processing circuit 315 is coupled to the analog-to-digital converter 310, and is arranged to process the digital receiving signal SD. The near end crosstalk noise cancellation circuit 320 comprises (K−1) near end internal crosstalk cancellation circuits 3201 and K near end external crosstalk cancellation circuits 3202. For example, as shown in FIG. 3, if a signal port corresponding to the physical-layer circuit has 4 channels, K is set as 4; however, the present invention is not limited thereto. For example, in this embodiment, the near end internal crosstalk cancellation circuit 3201 and the near end external crosstalk cancellation circuit 3202 are all arranged to perform compensation on analog signals. For example, 3 near end internal crosstalk cancellation circuits 3201 are arranged to generate and output an internal crosstalk compensation signal to an input of the programmable gain amplifier 305 according to 3 analog signals of other 3 transceiver circuits of the same physical-layer circuit (e.g. PHY_1), respectively, to perform compensation or cancellation of the near end internal crosstalk of different channels of the same physical-layer circuit on the input analog receiving signal Sin before the programmable gain amplifier 305 receives the input analog receiving signal Sin. In addition, 4 near end external crosstalk cancellation circuits 3202 are arranged to generate and output an external crosstalk compensation signal to the input of the programmable gain amplifier 305 according to multiple analog signals (e.g. analog input signals) of all 4 transceiver circuits of other at least one different physical-layer circuit, respectively, to perform compensation or cancellation of the near end external crosstalk of different channels of different physical-layer circuits on the input analog receiving signal Sin before the programmable gain amplifier 305 receives the input analog receiving signal Sin.

Figure 4:
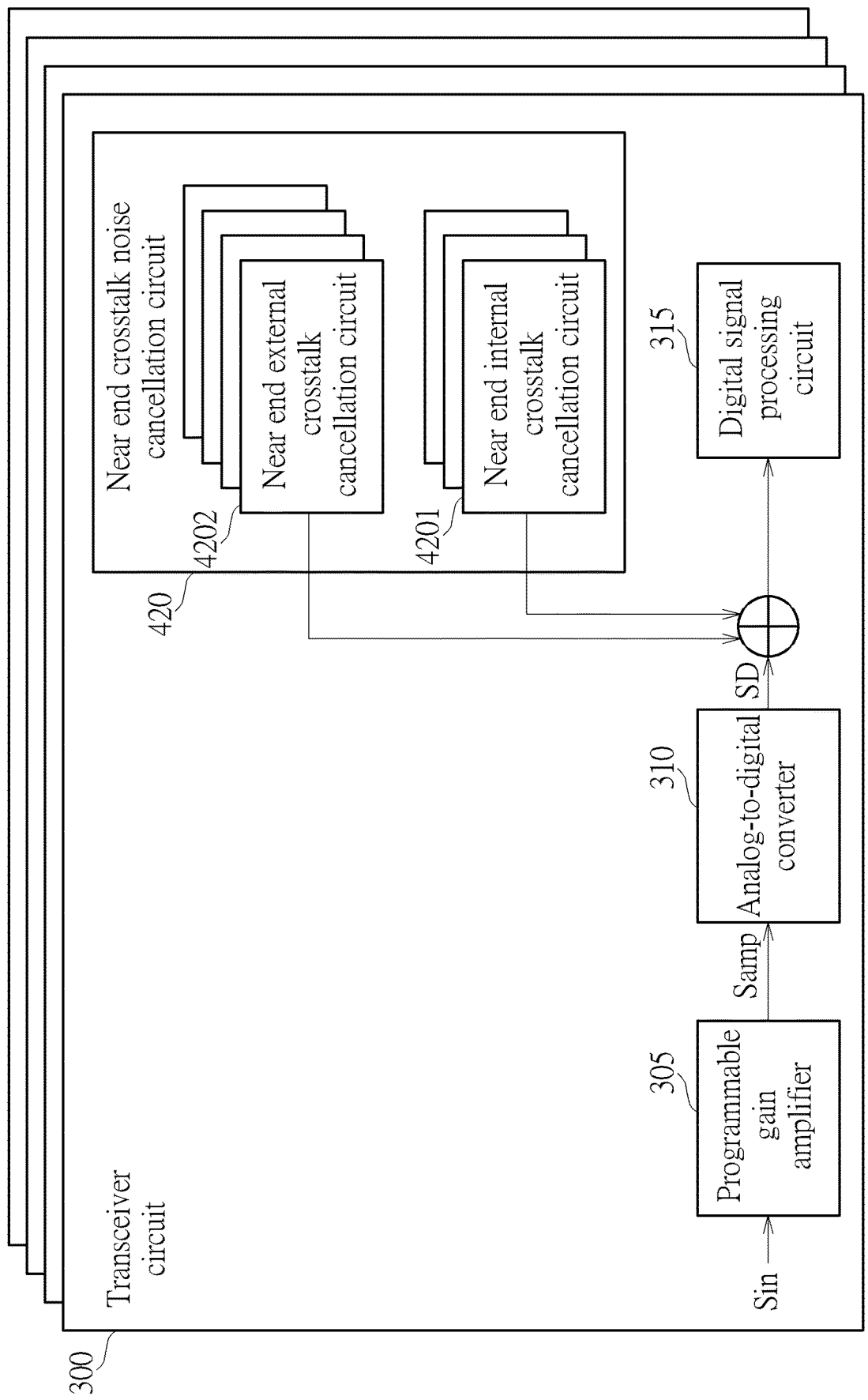
FIG. 4 is another block diagram illustrating one of multiple transceiver circuits of one or each of physical-layer circuits according to the embodiment of the present invention shown in FIG. 1.

In other words, for the compensation of the near end crosstalk noise interference performed in an analog domain, the compensation or cancellation is performed on the near end crosstalk noise interference of different channels of the same physical-layer circuit and/or different physical-layer circuits before the programmable gain amplifier 305 receives the input analog receiving signal Sin. Furthermore, in other embodiments, the above-mentioned near end internal crosstalk cancellation circuit and/or near end external crosstalk cancellation circuit may all be realized in a digital domain to perform compensation of the near end noise interference. Please refer to FIG. 4. FIG. 4 is another block diagram illustrating one of multiple transceiver circuits of one or each of physical-layer circuits according to the embodiment of the present invention shown in FIG. 1. As shown in FIG. 4, a physical-layer circuit (e.g. the first physical-layer circuit PHY_1 or the other physical-layer circuit) comprises multiple transceiver circuits corresponding to multiple channels (e.g. 4 channels of Ethernet), respectively. As a result, each physical-layer circuit, for example, comprises 4 transceiver circuits 400, wherein each transceiver circuit 400 corresponds to a specific channel, and comprises at least a programmable gain amplifier 305, an analog-to-digital converter 310, a digital signal processing circuit 315, and a near end crosstalk noise cancellation circuit 420. The near end crosstalk noise cancellation circuit 420 comprises (K−1) near end internal crosstalk cancellation circuits 4201 and K near end external crosstalk cancellation circuits 4202. For example, if a signal port corresponding to the physical-layer circuit has 4 channels, K is set as 4; however, the present invention is not limited thereto. For example, in this embodiment, the near end internal crosstalk cancellation circuit 4201 and the near end external crosstalk cancellation circuit 4202 are all arranged to perform compensation on digital signals. For example, 3 near end internal crosstalk cancellation circuits 4201 are arranged to generate and output an internal crosstalk compensation signal to an input of the digital signal processing circuit 315 according to 3 digital signals of other transceiver circuits (e.g. any digital-domain signal of the transceiver circuits) of the same physical-layer circuit (e.g. PHY_1), respectively, to perform compensation or cancellation of the near end internal crosstalk interference of different channels of the same physical-layer circuit on the digital signal SD before the digital signal processing circuit 315 receives the digital signal SD. In addition, 4 near end external crosstalk cancellation circuits 4202 are arranged to generate and output an external crosstalk compensation signal to the input of the digital signal processing circuit 315 according to multiple digital signals of all 4 transceiver circuits (e.g. any digital-domain signal of the transceiver circuits) of other at least one different physical-layer circuit, respectively, to perform compensation or cancellation of the near end external crosstalk interference of different channels of different physical-layer circuits on the digital signal SD before the digital signal processing circuit 315 receives the digital signal SD.

Furthermore, in other embodiments, the above-mentioned near end internal crosstalk cancellation circuit may be implemented in the analog domain and the near end external crosstalk cancellation circuit may be implemented in the digital domain, or the near end internal crosstalk cancellation circuit may be implemented in the digital domain and the near end external crosstalk cancellation circuit may be implemented in the analog domain. All such design changes belong to the scope of the present invention.

Figure 5:
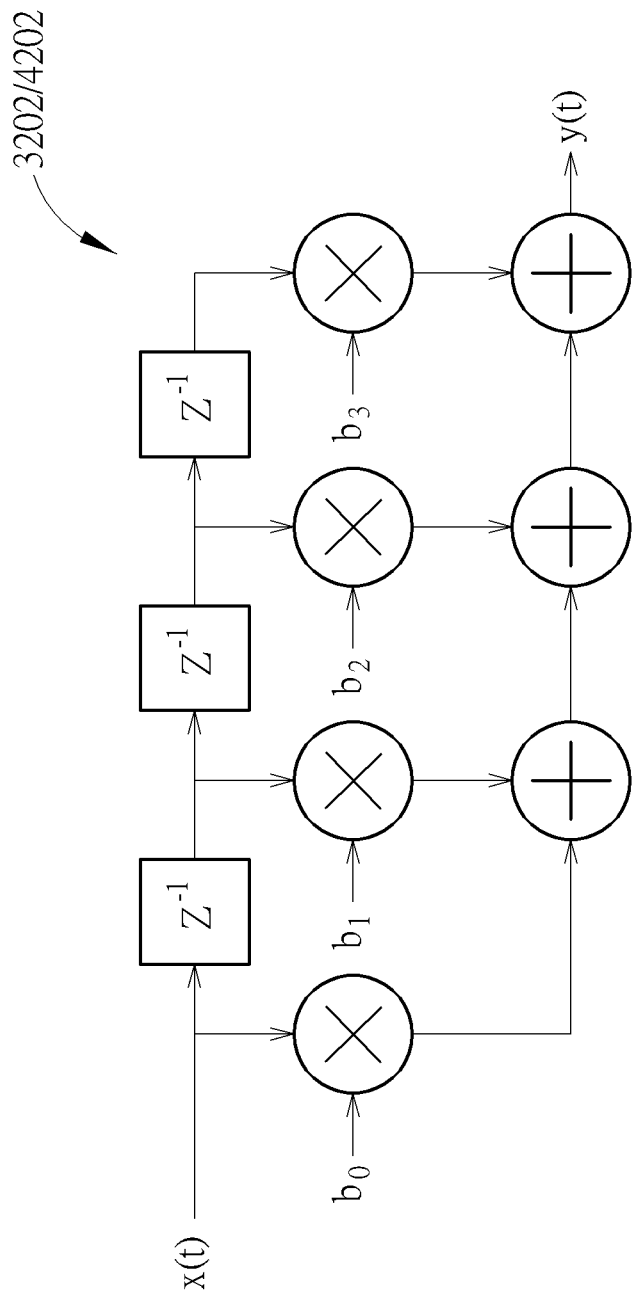
FIG. 5 is a diagram illustrating a near end external crosstalk cancellation circuit implemented by finite impulse response filter architecture.

Furthermore, for determining compensation coefficients of the near end external crosstalk cancellation circuit, in a convergence flow of the multi-PHY circuit 110 of the embodiment of the present invention, when the system is initially turned on, all physical-layer circuits corresponding to all signal ports are in the master mode at the same time and start to transmit signals simultaneously, so that all physical-layer circuits first converge and generate multiple compensation coefficients for compensating the near end crosstalk interference of one or more adjacent signal ports (i.e. multiple compensation coefficients of the above-mentioned near end external crosstalk cancellation circuit), respectively, and store the compensation coefficients. When converging and generating the compensation coefficients, the noise energy of the near end crosstalk interference of the adjacent signal ports is simultaneously considered to reserve the gain of the programmable gain amplifier 305 for subsequent signal connection, to avoid the noise energy of the near end crosstalk interference from affecting a dynamic range of the analog-to-digital converter 310. Please refer to FIG. 5. FIG. is a diagram illustrating the near end external crosstalk cancellation circuit 3202 or 4202 implemented by finite impulse response filter architecture, wherein coefficients $b_0$, $b_1$, $b_2$, and $b_3$ in the finite impulse response filter are the above-mentioned compensation coefficients, x(t) is an input signal, y(t) is an output signal, and $z^{-1}$ is a delay unit; however, the present invention is not limited thereto.

Figure 6:
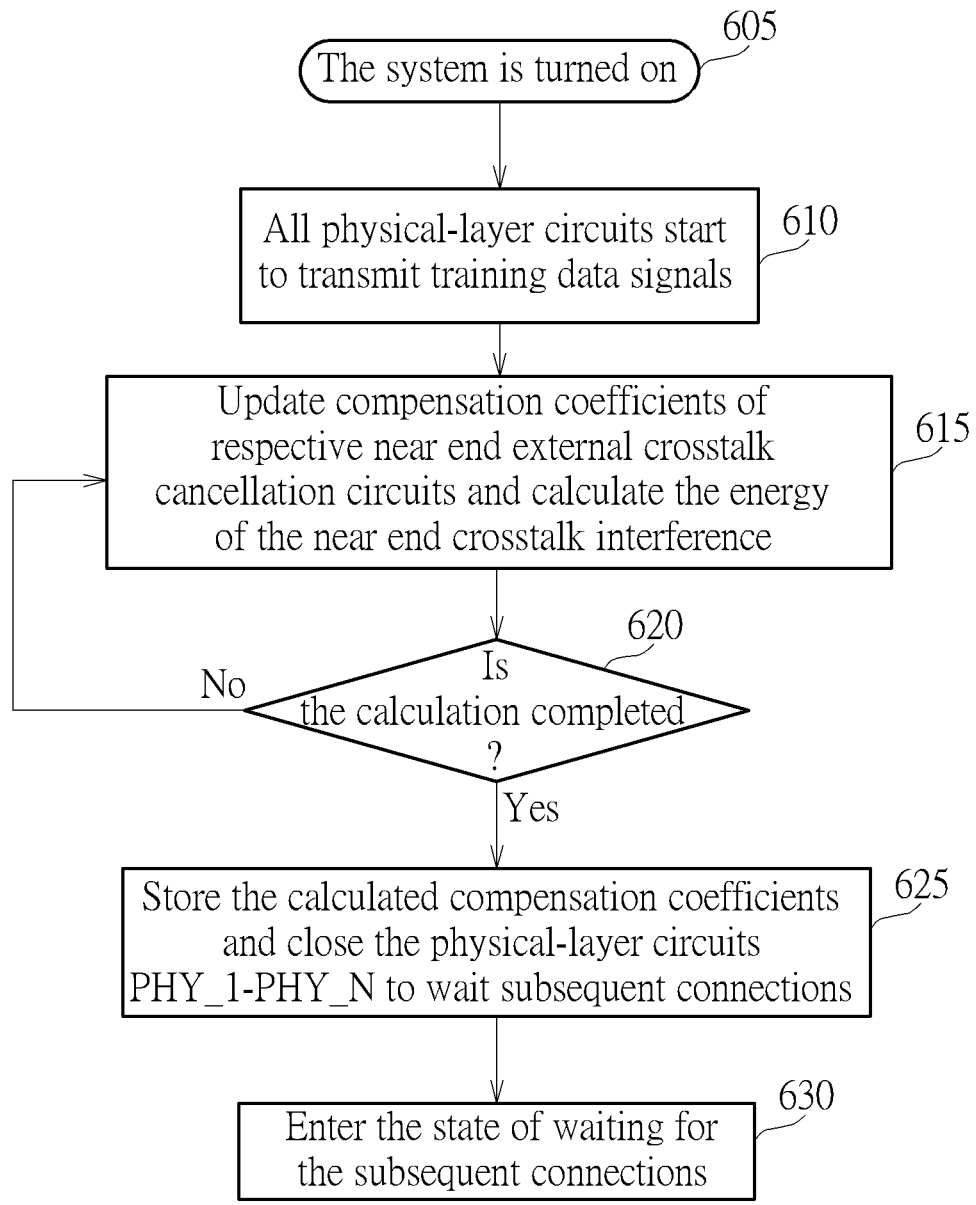
FIG. 6 is a convergence flowchart of determining compensation coefficients of a near end external crosstalk cancellation circuit or operations when a system of a multi-port physical-layer circuit is turned on according to an embodiment of the present invention.

Please refer to FIG. 6. FIG. 6 is a convergence flow chart of determining compensation coefficients of a near end external crosstalk cancellation circuit or operations when the system of the multi-PHY circuit 110 is turned on according to an embodiment of the present invention.

Step 605: The system of the multi-PHY circuit 110 is turned on;

Step 610: All physical-layer circuits PHY_1-PHY_N start to transmit signals (e.g. training data);

Step 615: All physical-layer circuits PHY_1-PHY_N update compensation coefficients of respective near end external crosstalk cancellation circuits and calculate the energy of the near end crosstalk interference of all physical-layer circuits;

Step 620: Is the calculation completed? If a period of time t has expired, it means that the calculation is completed and the flow goes to Step 625. On the contrary, if the period of time t is not expired yet, it means that the calculation is not completed, and the flow returns to Step 615 to continue to update compensation coefficients and calculate the energy of near end interference;

Step 625: Store the calculated compensation coefficients and close the physical-layer circuits PHY_1-PHY_N to wait subsequent connections; and Step 630: Enter the state of waiting for the subsequent connections.

Figure 7:
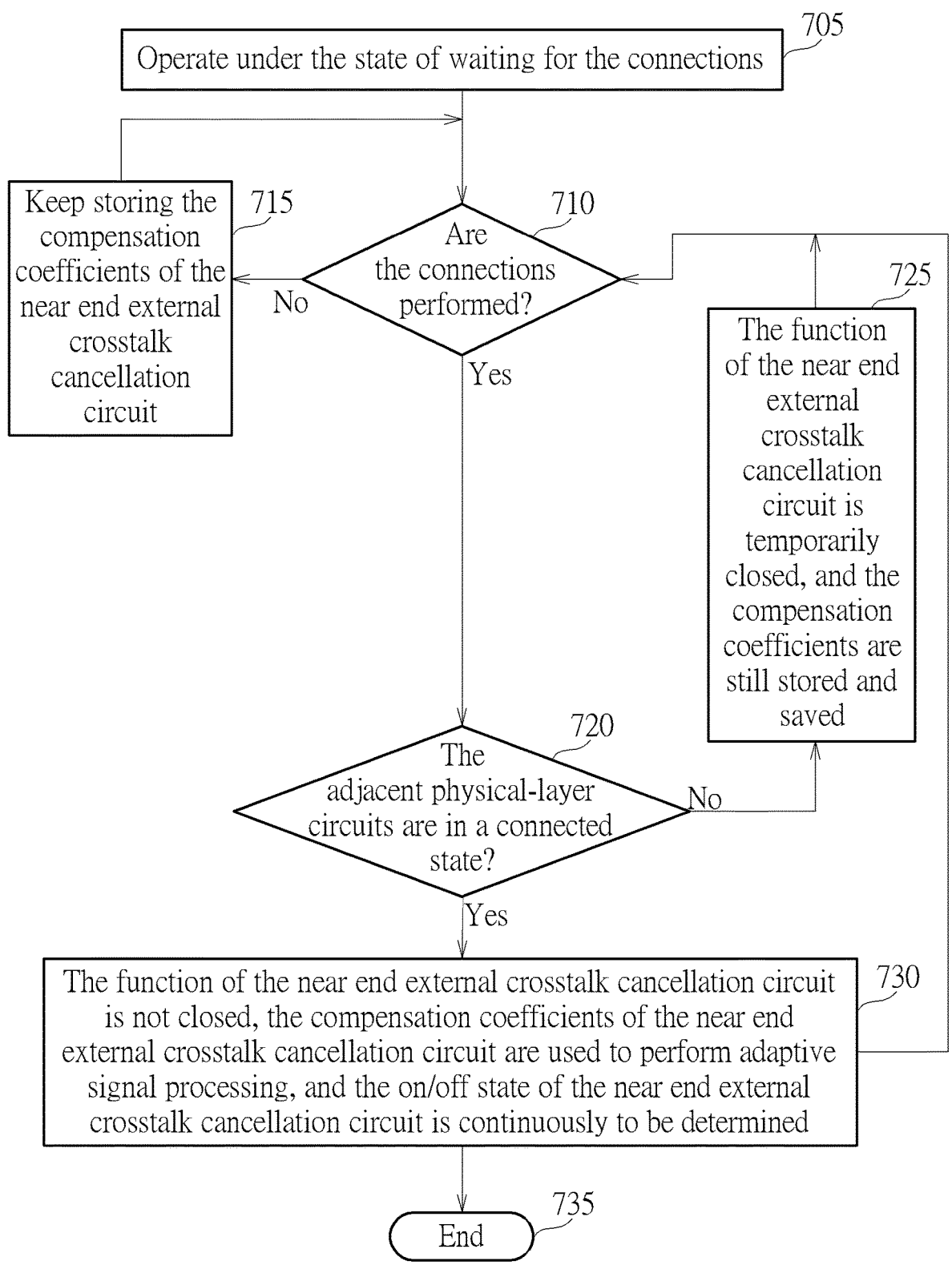
FIG. 7 is a flow chart illustrating operations of a near end external crosstalk cancellation circuit of each physical-layer circuit of a multi-port physical-layer circuit when the transceiver circuit is actually connected according to an embodiment of the present invention.

Please refer to FIG. 7. FIG. 7 is a flow chart of operations of a near end external crosstalk cancellation circuit of each physical-layer circuit of a multi-PHY circuit when the transceiver circuit is actually connected according to an embodiment of the present invention.

Step 705: Operate under the state of waiting for the connections;

Step 710: Is the physical-layer circuit connected to a link partner device? If yes, the flow goes to Step 720; otherwise, Step 715 is performed;

Step 715: When the physical-layer circuit is not connected to a link partner device, the compensation coefficients of the near end external crosstalk cancellation circuit continue to be stored, and Step 710 is returned to continue to detect and determine whether the physical-layer circuit is connected to a link partner device;

Step 720: When the physical-layer circuit is detected to be connected to a link partner device, detect and determine whether the adjacent physical-layer circuits are in a connected state? If the adjacent physical-layer circuits are not in the connected state, the flow goes to Step 725; otherwise, the flow goes to Step 730;

Step 725: Since the adjacent physical-layer circuits are not connected, the near end interference of different physical-layer circuits is not generated. The function of the near end external crosstalk cancellation circuit is temporarily closed, and the compensation coefficients of the near end external crosstalk cancellation circuit are still stored and saved;

Step 730: Since the adjacent physical-layer circuits are in the connected state, the function of the near end external crosstalk cancellation circuit is not closed. The compensation coefficients (e.g. the above-mentioned coefficients determined in FIG. 6) of the near end external crosstalk cancellation circuit are used to perform adaptive signal processing, and the connected state of the current physical-layer circuit and the adjacent physical-layer circuits is continuously checked to determine the on/off state of the near end external crosstalk cancellation circuit; and Step 735: End.

It should be noted that the state of waiting for the connections in Step 705 may be the same as the state of waiting for the subsequent connections entered in Step 630 shown in FIG. 6. In other words, the flows in FIGS. 6 and 7 may be connected together through Step 630 and Step 705.

Therefore, according to operations of the flows in FIGS. 6 and 7, for a physical-layer circuit that has stably converged cancellation or compensation of the external crosstalk interference and is transmitting packets, even if the adjacent signal ports are used midway to start transmitting signals, the physical-layer circuit is not greatly affected by this suddenly appeared near end external crosstalk interference and keeps transmitting the packets without leaving the converged state, the dynamic range of the analog-digital converter is not affected by this suddenly appeared near end external crosstalk interference, and the network packet drop or cyclic redundancy check (CRC) failure does not happen. In addition, the compensation coefficients of the near end crosstalk noise cancellation circuit of each transceiver circuit may be stored in a storage circuit (not shown) until each physical-layer circuit has completed the convergence of the compensation for the external crosstalk interference. If the signal ports adjacent to the physical-layer circuit do not transmit data, the function of the near end external crosstalk cancellation circuit in the near end crosstalk noise cancellation circuit may be turned off. On the contrary, if the data is transmitted, the compensation coefficients that have converged before may be used and then updated continuously, which may avoid the risk of unstable convergence in the transient process.

In addition, each physical-layer circuit in the multi-PHY circuit of the embodiment of the present invention is not limited to using the same transmission speed mode. For example, in order to reduce the design complexity of the near end external crosstalk cancellation circuit, each signal port may use the same transmission speed mode; however, the present invention is not limited thereto. The multiple signal ports of the embodiment of the present invention may have a design of different transmission speeds.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An Ethernet transceiver device, comprising:
a crystal oscillator, arranged to generate an output oscillation signal;
a multi-port physical-layer circuit, coupled to the crystal oscillator, comprising at least:
a first port;
at least one second port;
a first physical-layer circuit, corresponding to the first port, and connected to a first link partner device through the first port and a first Ethernet cable; and
at least one second physical-layer circuit, corresponding to the at least one second port, and connected to at least one second link partner device through the at least one second port and at least one second Ethernet cable;

wherein all of the first physical-layer circuit and the at least one second physical-layer circuit receive the output oscillation signal from the crystal oscillator at a same time, and utilize the output oscillation signal to generate multiple clock waveforms, respectively, without clock synchronization; and when a crosstalk noise is converged and compensated, the first physical-layer circuit and the at least one second physical-layer circuit are all configured in a master mode.

2. The Ethernet transceiver device of claim 1, wherein the first port has K channels, and the first physical-layer circuit comprises:
K transceiver circuits, each corresponding to a specific channel and comprising:
a programmable gain amplifier, arranged to receive an input analog receiving signal of the specific channel, and amplify the input analog receiving signal to generate an amplified analog signal;
an analog-to-digital converter, coupled to the programmable gain amplifier, and arranged to perform an analog-to-digital conversion on the amplified analog signal for generating a digital receiving signal;
a digital signal processing circuit, coupled to the analog-to-digital converter, and arranged to process the digital receiving signal; and
a near end crosstalk noise cancellation circuit, arranged to generate and output an internal crosstalk compensation signal to an input of the programmable gain amplifier according to (K−1) analog signals of other (K−1) transceiver circuits of the first physical-layer circuit, and further arranged to generate and output an external crosstalk compensation signal to the input of the programmable gain amplifier according to multiple analog signals of all transceiver circuits of the at least one second physical-layer circuit.

3. The Ethernet transceiver device of claim 1, wherein the first port has K channels, and the first physical-layer circuit comprises:
K transceiver circuits, each corresponding to a specific channel and comprising:
a programmable gain amplifier, arranged to receive an input analog receiving signal of the specific channel, and amplify the input analog receiving signal to generate an amplified analog signal;
an analog-to-digital converter, coupled to the programmable gain amplifier, and arranged to perform an analog-to-digital conversion on the amplified analog signal for generating a digital receiving signal;
a digital signal processing circuit, coupled to the analog-to-digital converter, and arranged to process the digital receiving signal; and
a near end crosstalk noise cancellation circuit, arranged to generate and output an internal crosstalk compensation signal to an input of the digital signal processing circuit according to (K−1) digital signals of other (K−1) transceiver circuits of the first physical-layer circuit, and further arranged to generate and output an external crosstalk compensation signal to the input of the digital signal processing circuit according to multiple digital signals of all transceiver circuits of the at least one second physical-layer circuit.

4. The Ethernet transceiver device of claim 1, wherein the first port has K channels, and the first physical-layer circuit comprises:

K transceiver circuits, each corresponding to a specific channel and comprising:
a programmable gain amplifier, arranged to receive an input analog receiving signal of the specific channel, and amplify the input analog receiving signal to generate an amplified analog signal;
an analog-to-digital converter, coupled to the programmable gain amplifier, and arranged to perform an analog-to-digital conversion on the amplified analog signal for generating a digital receiving signal;
a digital signal processing circuit, coupled to the analog-to-digital converter, and arranged to process the digital receiving signal; and
a near end crosstalk noise cancellation circuit, arranged to generate and output an internal crosstalk compensation signal to an input of the programmable gain amplifier according to (K−1) analog signals of other (K−1) transceiver circuits of the first physical-layer circuit, and further arranged to generate and output an external crosstalk compensation signal to an input of the digital signal processing circuit according to multiple digital signals of all transceiver circuits of the at least one second physical-layer circuit.

5. The Ethernet transceiver device of claim 1, wherein the first port has K channels, and the first physical-layer circuit comprises:
K transceiver circuits, each corresponding to a specific channel and comprising:
a programmable gain amplifier, arranged to receive an input analog receiving signal of the specific channel, and amplify the input analog receiving signal to generate an amplified analog signal;
an analog-to-digital converter, coupled to the programmable gain amplifier, and arranged to perform an analog-to-digital conversion on the amplified analog signal for generating a digital receiving signal;
a digital signal processing circuit, coupled to the analog-to-digital converter, and arranged to process the digital receiving signal; and
a near end crosstalk noise cancellation circuit, arranged to generate and output an internal crosstalk compensation signal to an input of the digital signal processing circuit according to (K−1) digital signals of other (K−1) transceiver circuits of the first physical-layer circuit, and further arranged to generate and output an external crosstalk compensation signal to an input of the programmable gain amplifier according to multiple analog signals of all transceiver circuits of the at least one second physical-layer circuit.

6. An Ethernet physical-layer circuit, corresponding to a first port, and connected to a first link partner device through the first port and a first Ethernet cable, wherein all of the Ethernet physical-layer circuit and other at least one physical-layer circuit receive an output oscillation signal from a crystal oscillator at a same time, and utilize the output oscillation signal to generate multiple clock waveforms, respectively, without clock synchronization; and when a crosstalk noise is converged and compensated, the Ethernet physical-layer circuit and the other at least one physical-layer circuit are all configured in a master mode.

7. The Ethernet physical-layer circuit of claim 6, wherein the first port has K channels, and the Ethernet physical-layer circuit comprises:
K transceiver circuits, each corresponding to a specific channel and comprising:
a programmable gain amplifier, arranged to receive an input analog receiving signal of the specific channel, and amplify the input analog receiving signal to generate an amplified analog signal;
an analog-to-digital converter, coupled to the programmable gain amplifier, and arranged to perform an analog-to-digital conversion on the amplified analog signal for generating a digital receiving signal;
a digital signal processing circuit, coupled to the analog-to-digital converter, and arranged to process the digital receiving signal; and
a near end crosstalk noise cancellation circuit, arranged to generate and output an internal crosstalk compensation signal to an input of the programmable gain amplifier according to (K−1) analog signals of other (K−1) transceiver circuits of the Ethernet physical-layer circuit, and further arranged to generate and output an external crosstalk compensation signal to the input of the programmable gain amplifier according to multiple analog signals of all transceiver circuits of the other at least one physical-layer circuit.

8. The Ethernet physical-layer circuit of claim 6, wherein the first port has K channels, and the Ethernet physical-layer circuit comprises:
K transceiver circuits, each corresponding to a specific channel and comprising:
a programmable gain amplifier, arranged to receive an input analog receiving signal of the specific channel, and amplify the input analog receiving signal to generate an amplified analog signal;
an analog-to-digital converter, coupled to the programmable gain amplifier, and arranged to perform an analog-to-digital conversion on the amplified analog signal for generating a digital receiving signal;
a digital signal processing circuit, coupled to the analog-to-digital converter, and arranged to process the digital receiving signal; and
a near end crosstalk noise cancellation circuit, arranged to generate and output an internal crosstalk compensation signal to an input of the digital signal processing circuit according to (K−1) digital signals of other (K−1) transceiver circuits of the Ethernet physical-layer circuit, and further arranged to generate and output an external crosstalk compensation signal to the input of the digital signal processing circuit according to multiple digital signals of all transceiver circuits of the other at least one physical-layer circuit.

9. The Ethernet physical-layer circuit of claim 6, wherein the first port has K channels, and the Ethernet physical-layer circuit comprises:
K transceiver circuits, each corresponding to a specific channel and comprising:
a programmable gain amplifier, arranged to receive an input analog receiving signal of the specific channel, and amplify the input analog receiving signal to generate an amplified analog signal;
an analog-to-digital converter, coupled to the programmable gain amplifier, and arranged to perform an analog-to-digital conversion on the amplified analog signal for generating a digital receiving signal;
a digital signal processing circuit, coupled to the analog-to-digital converter, and arranged to process the digital receiving signal; and
a near end crosstalk noise cancellation circuit, arranged to generate an internal crosstalk compensation signal to an input of the programmable gain amplifier according to (K−1) analog signals of other (K−1) transceiver circuits of the Ethernet physical-layer circuit, and further arranged to generate and output an external crosstalk compensation signal to an input of the digital signal processing circuit according to multiple digital signals of all transceiver circuits of the other at least one physical-layer circuit.

10. The Ethernet physical-layer circuit of claim 6, wherein the first port has K channels, and the Ethernet physical-layer circuit comprises:

K transceiver circuits, each corresponding to a specific channel and comprising:
- a programmable gain amplifier, arranged to receive an input analog receiving signal of the specific channel, and amplify the input analog receiving signal to generate an amplified analog signal;
- an analog-to-digital converter, coupled to the programmable gain amplifier, and arranged to perform an analog-to-digital conversion on the amplified analog signal for generating a digital receiving signal;
- a digital signal processing circuit, coupled to the analog-to-digital converter, and arranged to process the digital receiving signal; and
- a near end crosstalk noise cancellation circuit, arranged to generate and output an internal crosstalk compensation signal to an input of the digital signal processing circuit according to (K−1) digital signals of other (K−1) transceiver circuits of the Ethernet physical-layer circuit, and further arranged to generate and output an external crosstalk compensation signal to an input of the programmable gain amplifier according to multiple analog signals of all transceiver circuits of the other at least one physical-layer circuit.

* * * * *